US012671049B2

(12) United States Patent
Ao et al.

(10) Patent No.: US 12,671,049 B2
(45) Date of Patent: Jun. 30, 2026

(54) CIRCUIT BREAKER AND QUICK TRIPPING DEVICE THEREOF

(71) Applicant: Chint Low Voltage Electrical Technology Co., Ltd., Shanghai (CN)

(72) Inventors: Denggui Ao, Shanghai (CN); Dengyu Lu, Shanghai (CN); Hao Fu, Shanghai (CN); Yongfu Xu, Shanghai (CN); Xiaoqin Yuan, Shanghai (CN); Lijun Yan, Shanghai (CN); Chuncui Wang, Shanghai (CN)

(73) Assignee: Chint Low Voltage Electrical Technology Co., Ltd. (CN)

( * ) Notice: Subject to any disclaimer, the term of this patent is extended or adjusted under 35 U.S.C. 154(b) by 268 days.

(21) Appl. No.: 18/556,828

(22) PCT Filed: Sep. 13, 2022

(86) PCT No.: PCT/CN2022/118296
§ 371 (c)(1),
(2) Date: Oct. 23, 2023

(87) PCT Pub. No.: WO2023/284898
PCT Pub. Date: Jan. 19, 2023

(65) Prior Publication Data

US 2024/0242910 A1 Jul. 18, 2024

(30) Foreign Application Priority Data

Jul. 15, 2021 (CN) ......................... 202110809551.2

(51) Int. Cl.
*H01H 71/24* (2006.01)

(52) U.S. Cl.
CPC ............................... *H01H 71/2454* (2013.01)

(58) Field of Classification Search
CPC .. H01H 71/02; H01H 71/0235; H01H 71/025; H01H 71/0264; H01H 71/06;
(Continued)

(56) References Cited

U.S. PATENT DOCUMENTS

| | | | | |
|---|---|---|---|---|
| 5,103,198 | A | 4/1992 | Morel et al. | |
| 2004/0090293 | A1 * | 5/2004 | Castonguay ......... | H01H 73/045 335/172 |
| 2020/0152408 | A1 | 5/2020 | Djogo et al. | |

FOREIGN PATENT DOCUMENTS

| | | | |
|---|---|---|---|
| CN | 1366698 | A | 8/2002 |
| CN | 101030506 | A | 9/2007 |

(Continued)

OTHER PUBLICATIONS

International Search Report mailed Nov. 7, 2022 in corresponding PCT International Application No. PCT/CN2022/118296.

*Primary Examiner* — Anthony R Jimenez
(74) *Attorney, Agent, or Firm* — OSTROLENK FABER LLP

(57) ABSTRACT

A quick tripping device of a circuit breaker having a contact system that includes a moving contact mechanism and a static contact, wherein the moving contact mechanism includes a contact support and a moving contact, and a contact spring having two ends connected with the moving contact and the contact support respectively. The quick tripping device further includes a first transmission structure in driving fit with the contact spring and rotatable along with the contact spring. When a short-circuiting current flows through the contact system, the moving contact is repelled by an electric repulsive force between the moving contact and the static contact, so that the moving contact rotates relative to the contact support. The moving contact drives
(Continued)

the first transmission structure to rotate through the contact spring, and the first transmission structure drives an operating mechanism to trip.

15 Claims, 9 Drawing Sheets

(58) Field of Classification Search
CPC ............. H01H 71/1072; H01H 71/121; H01H 71/125; H01H 71/24; H01H 71/501; H01H 71/524; H01H 71/58; H01H 71/0207; H01H 71/0257; H01H 71/0271; H01H 71/126; H01H 71/16; H01H 71/161; H01H 71/2418
USPC .............................................................. 200/3
See application file for complete search history.

(56) References Cited

FOREIGN PATENT DOCUMENTS

| | | | |
|---|---|---|---|
| CN | 102103948 | A | 6/2011 |
| CN | 204303699 | U | 4/2015 |
| CN | 112466726 | A | 3/2021 |
| CN | 216624153 | U | 5/2022 |

* cited by examiner

CIRCUIT BREAKER AND QUICK TRIPPING DEVICE THEREOF

CROSS-REFERENCE TO RELATED APPLICATIONS

The present application is a 35 U.S.C. §§ 371 national stage application of International Application No. PCT/CN2022/118296, filed Sep. 13, 2022, which claims priority to Chinese Patent Application No. 2021110809551.2 filed Jul. 15, 2021, the contents of which are incorporated herein by reference.

TECHNICAL FIELD

The present invention relates to the field of low-voltage electric appliances, and more particularly, to a quick tripping device of a circuit breaker, and the circuit breaker including the quick tripping device.

BACKGROUND ART

As we all know; an electric repulsion force between a moving contact and a static contact of a circuit breaker under normal energization is less than a final pressure between the contacts. In the case of short-circuiting, the electric repulsion force between the moving contact and the static contact increases sharply. When the electric repulsion force is greater than the final pressure between the contacts, the moving contact is repelled by the static contact to be separated from the static contact, and then the moving contact moves in a direction away from the static contact against the final pressure between the contacts. In the process of this movement, the electric repulsion force gradually decreases, while a force by which the moving contact and the static contact are closed gradually increases. At this time, if the operating mechanism of the circuit breaker does not actuate (trip), the repulsed moving contact will fall back within a short time, causing secondary closing of the circuit breaker. The secondary closing of the circuit breaker is avoided by providing a quick tripping device on the circuit breaker.

The quick tripping device of the existing circuit breaker generally has the following problems.

I. The existing quick tripping device is complex in structure and cumbersome in mounting, and occupies a large space.

II. The malfunction of the quick tripping device, e.g., a quick tripping device of a circuit breaker disclosed by the Chinese patent CN1366698A, will be caused by the bounce of the moving contact due to high sensitivity when the circuit breaker is closed normally.

III. The quick tripping device has poor reliability and is easy to fail. For example, the U.S. patent U.S. Pat. No. 5,103,198A discloses a circuit breaker, in which a quick tripping device uses a sensor to detect the pressure intensity inside a circuit breaker housing and push a piston to trip an operating mechanism, which makes the sealability of the circuit breaker housing difficult to be perfect, and also causes a second piston to be easily polluted by an arc gas, resulting in delayed piston action.

SUMMARY OF THE INVENTION

The present invention aims to overcome the defects of the prior art, and provide a quick tripping device of a circuit breaker. The quick tripping device is simple in structure, convenient to assemble and capable of achieving quick tripping of the circuit breaker. The present invention further provides a circuit breaker including the quick tripping device which can avoid secondary closing of the circuit breaker.

In order to achieve the above object, the present invention adopts the following technical solutions:

A quick tripping device of a circuit breaker, comprising an operating mechanism and a contact system, the contact system comprises a moving contact mechanism and a static contact which are used cooperatively; the moving contact mechanism comprises a contact support rotatably disposed around a first center, and a moving contact disposed on the contact support and capable of rotating relative to the contact support; the moving contact mechanism further comprises a contact spring, and two ends of the contact spring are connected with the moving contact and the contact support respectively; the quick tripping device further comprises a first transmission structure rotatably disposed on the contact support and being in driving fit with the operating mechanism; the first transmission structure is in driving fit with the contact spring and rotates along with the contact spring; when a short-circuiting current flows through the contact system, the moving contact is repelled by an electric repulsive force between the moving contact and the static contact, so that the moving contact rotates relative to the contact support; the moving contact drives the first transmission structure to rotate through the contact spring; and the first transmission structure drives the operating mechanism to trip.

Preferably, the first transmission structure and the contact spring are disposed coaxially and rotate synchronously.

Preferably, the first transmission structure comprises a transmission structure mounting portion and a transmission structure driven portion; the contact spring comprises a contact spring body, as well as a first spring end and a second spring end respectively connected with two ends of the contact spring body; the first spring end comprises a first end hanging portion and a first end connecting portion, and two ends of the first end connecting portion are respectively connected with the first end hanging portion and the contact spring body; the transmission structure mounting portion and the first end hanging portion are both rotatably arranged on a first mounting shaft; the transmission structure driven portion is mounted on the first end connecting portion; and the second spring end is connected with the moving contact through a second mounting shaft.

Preferably, the first transmission structure further comprises a transmission structure connecting hole formed in the transmission structure driven portion, and the transmission structure driven portion is disposed to sleeve the first end connecting portion through the transmission structure connecting hole.

Preferably, the first transmission structure drives the operating mechanism directly or indirectly to trip.

Preferably, the quick tripping device further comprising an intermediate transmission structure and a second transmission structure, wherein the first transmission structure is in driving fit with the second transmission structure through the intermediate transmission structure, and the second transmission structure is in driving fit with the operating mechanism.

Preferably, the intermediate transmission structure comprises a first intermediate push rod, a first intermediate shaft, a second intermediate push rod and a second intermediate shaft, wherein the first intermediate push rod is in driving fit with the first transmission structure; the first intermediate push rod and the second intermediate push rod are fixedly connected to the first intermediate shaft respectively; the first intermediate push rod, the second intermediate push rod and the first intermediate shaft are disposed to rotate synchronously around an axis of the first intermediate shaft; and the second intermediate shaft is connected with the second intermediate push rod and is in driving fit with the second transmission structure.

Preferably, the first intermediate push rod comprises a first intermediate push rod driven portion which is in driving fit with the first transmission structure, and a first intermediate push rod limiting portion; and the quick tripping device further comprises an intermediate push rod limiting protrusion which is in limiting fit with the first intermediate push rod limiting portion.

Preferably, the second transmission structure is a second push rod; and the second push rod is rotatably mounted on a second push rod shaft, and is provided with a push rod driven hole that is in driving fit with the second intermediate shaft, and a push rod driving part that is in driving fit with a re-buckle of the operating mechanism.

Preferably, the second push rod is of a triangular plate-like structure, at one vertex angle of which the push rod driven hole is formed, at a second vertex angle of which the second push rod shaft is disposed rotatably, and at a third vertex angle of which the push rod driving part is disposed; and the re-buckle comprises a re-buckle driven column which is in driving fit with the push rod driving part.

Preferably, the operating mechanism comprises a jump buckle, a lock buckle and the re-buckle; the jump buckle is in locking fit with the lock buckle; the lock buckle is in limiting fit with the re-buckle; and the first transmission structure is in driving fit with the re-buckle directly or indirectly, such that the operating mechanism trips.

Preferably, a transmission path from the contact spring to the operating mechanism is provided with a driving gap, and the driving gap makes the contact spring rotate to a set angle and then drives the operating mechanism to trip.

Preferably, a transmission path from the contact spring to the operating mechanism is provided with a driving gap, and the driving gap makes the contact spring turn around a set angle and then drives the operating mechanism to trip, the driving gap may also be provided between the contact spring and the first transmission structure, or between the first transmission structure and the first intermediate push rod, or between the second transmission structure and the re-buckle of the operating mechanism.

Preferably, the operating mechanism further includes a bracket, a rocker arm assembly rotatably disposed on the bracket, a first crank rotatably disposed on the jump buckle around a second center, an energy storage spring, sliding rails, a slide block, and a first connecting rod. The jump buckle, the lock buckle and the re-buckle are rotatably disposed on the bracket, respectively. The rocker arm assembly includes a synchronously actuated handle, a rocker arm, and a reset structure for driving the jump buckle and the lock buckle to rebuckle. The rocker arm is rotatably disposed on the bracket. The first crank includes a crank limiting portion, which is in limiting fit with the jump buckle when the operating mechanism is in a closed state or tripped state. The slide block is disposed on the sliding rails and slides reciprocally in its extension direction. One end of the first connecting rod and one end of the energy storage spring are rotatably connected to the first crank around a third center, the other end of the first connecting rod is rotatably connected to the slide block, and the other end of the energy storage spring is rotatably connected to the rocker arm assembly. The sliding rails are in limiting fit with the slide block to prevent the slide block from slipping when the operating mechanism is in a disconnected state or tripped state.

Preferably, the contact spring remains on one side of the first center when the moving contact and the static contact are normally closed or disconnected; when the moving contact is repelled by an electric repulsion force between the moving contact and the static contact, the moving contact drives the contact spring to rotate, so that an axis of the contact spring swings to the other side of the first center; the contact spring applies a breaking force to the moving contact to remain the moving contact in a breaking position; and Preferably, when the contact spring swings from one side of the first center to the other side of the first center and when the contact spring is located in a dead point position, the first center is located on the axis of the contact spring.

A circuit breaker, comprising the quick tripping device.

Preferably, the circuit breaker further comprising at least one circuit breaker pole, each circuit breaker pole comprising a unit housing and a contact system disposed within the unit housing; the first intermediate shaft of the quick tripping device is inserted in the unit housing. and an inner end and an outer end of the first intermediate shaft are in driving connection to the first intermediate push rod and the second intermediate push rod, respectively; and the second transmission structure of the quick tripping device is rotatably disposed outside the unit housing.

According to the quick tripping device of the circuit breaker of the present invention, the first transmission structure is in driving fit with the contact spring and rotates along with the contact spring, so it is unnecessary to provide a separate component or structure to drive the first transmission structure to reset, thereby simplifying the structure of the quick tripping device. When a short-circuiting current flows through the contact system, the moving contact drives the first transmission structure to rotate through the contact spring so as to drive the operating mechanism to trip, thereby avoiding secondary closing of the moving contact and the static contact, and achieving quick tripping of the circuit breaker.

Furthermore, the malfunction of the quick tripping device due to the bounce of the moving contact is avoided when the moving contact and the static contact are closed normally.

The circuit breaker of the present invention includes the quick tripping device which can avoid secondary closing when a short-circuiting current flows through the circuit breaker, thereby achieving good breaking performance.

DETAILED DESCRIPTIONS OF THE PREFERRED EMBODIMENTS

The specific implementation of a quick tripping device of a circuit breaker and the circuit breaker of the present invention will be further described below with reference to the embodiments given in FIGS. 1 to 9. The circuit breaker and the quick tripping device thereof of the present invention are not limited to the description of the following embodiments.

Figure 1:
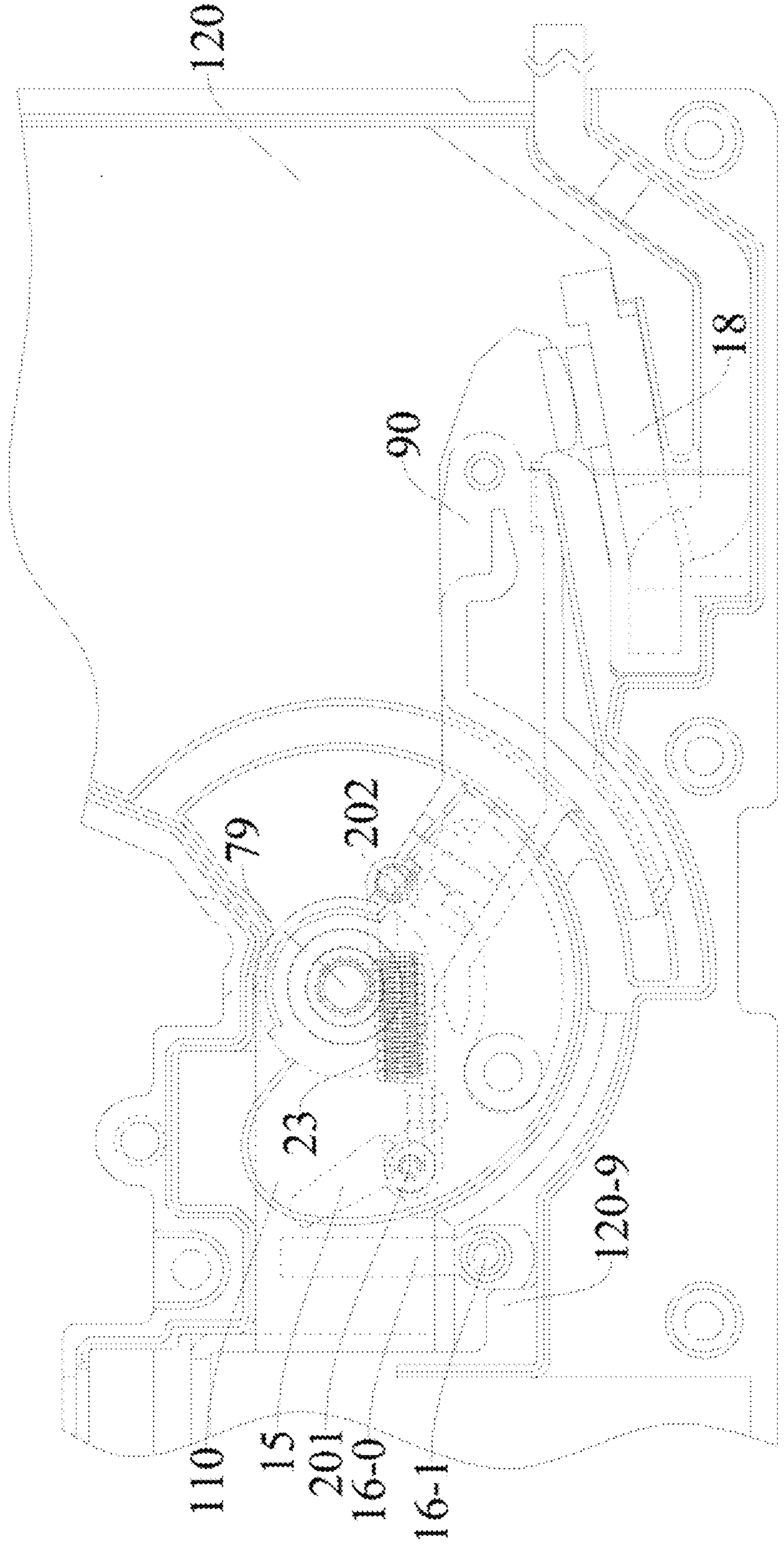
FIG. 1 is a schematic structural diagram of a quick tripping device of the present invention, in which a moving contact and a static contact are in a closed state, and a mating relationship of a moving contact mechanism, a first transmission structure, a first intermediate push rod and a first intermediate shaft is shown.
Figure 2:
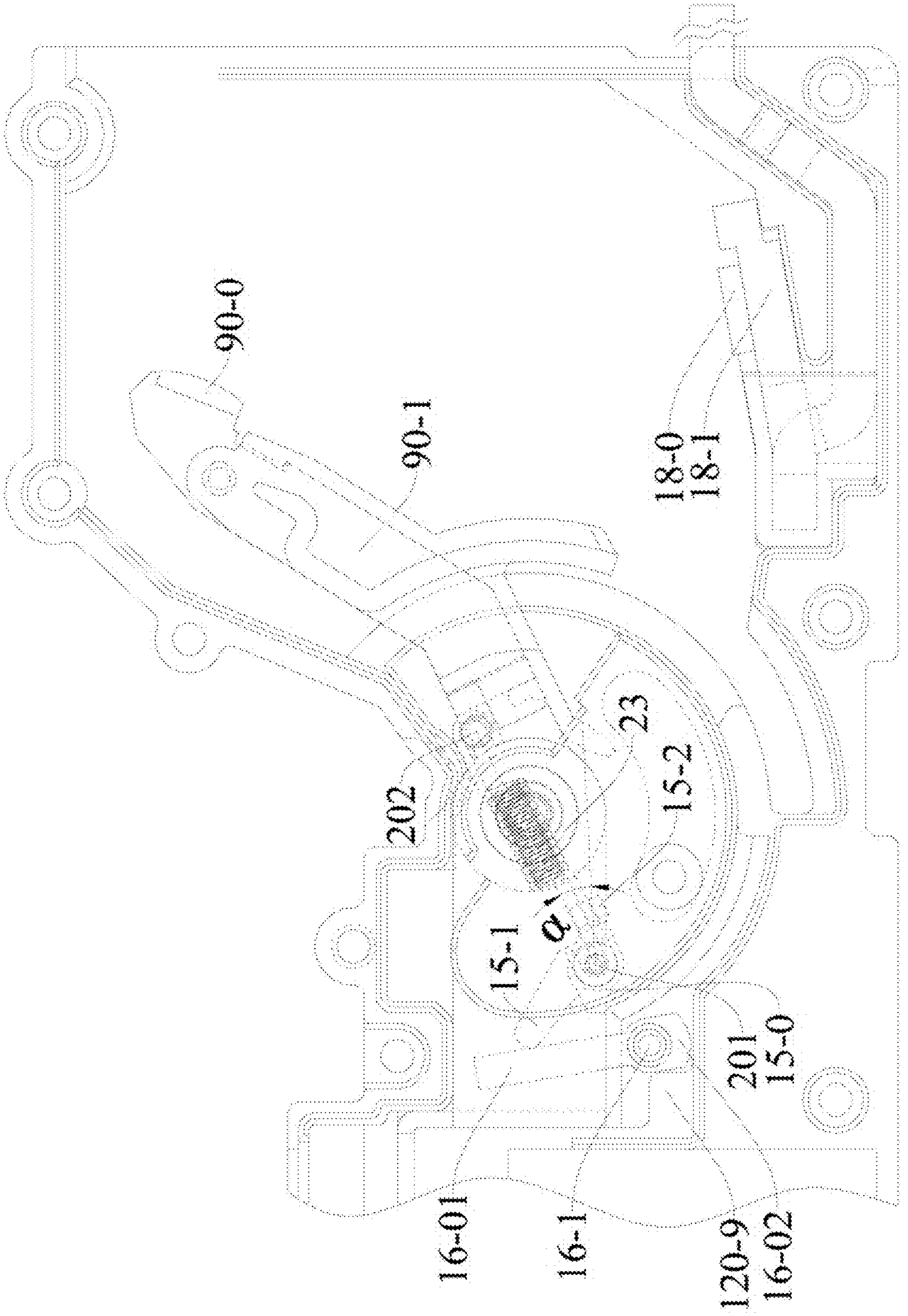
FIG. 2 is a schematic structural diagram of the quick tripping device of the present invention, in which the moving contact is repelled by the static contact, and the mating relationship of the moving contact mechanism, the first transmission structure, the first intermediate push rod and the first intermediate shaft is shown.

As shown in FIG. 1 and FIG. 2, a quick tripping device of a circuit breaker of the present invention is provided. The quick tripping device includes an operating mechanism 1 and a contact system. The contact system includes a moving contact mechanism and a static contact 18 which are used cooperatively. The moving contact mechanism includes a contact support 110 rotatably disposed around a first center 79, and a moving contact 90 disposed on the contact support 110 and capable of rotating relative to the contact support 110. The moving contact mechanism further includes a contact spring 23, and two ends of the contact spring 23 are connected with the moving contact 90 and the contact support 110 respectively. The quick tripping device further includes a first transmission structure 15 rotatably disposed on the contact support 110 and being in driving fit with the operating mechanism 1. The first transmission structure 15 is in driving fit with the contact spring 23 and rotates along with the contact spring 23. When a short-circuiting current flows through the contact system, the moving contact 90 is repelled by an electric repulsive force between the moving contact 90 and the static contact 18, so that the moving contact 90 rotates relative to the contact support 110. The moving contact 90 drives the first transmission structure 15 to rotate through the contact spring 23. The first transmission structure 15 drives the operating mechanism to trip.

According to the quick tripping device of the circuit breaker of the present invention, the first transmission structure is in driving fit with the contact spring and rotates along with the contact spring, so it is unnecessary to provide a separate component or structure to drive the first transmission structure to reset, thereby simplifying the structure of the quick tripping device. When a short-circuiting current flows through the contact system, the moving contact drives the first transmission structure to rotate through the contact spring so as to drive the operating mechanism to trip, thereby avoiding secondary closing of the moving contact and the static contact, and achieving quick tripping of the circuit breaker.

It should be pointed out that the rotation of the first transmission structure 15 along with the contact spring 23 includes at least the following two meanings: 1, the first transmission structure 15 rotates synchronously with the contact spring 23, that is, the contact spring 23 rotates and also drives the first transmission structure 15 to rotate; and 2, the first transmission structure 15 is driven by the contact spring 23 to rotate after the contact spring 23 rotates at a certain angle. As an embodiment of asynchronous rotation, the first transmission structure 15 may be rotatably mounted on one side of the contact spring 23 in a rotation direction, and drives the first transmission structure 15 to rotate after the contact spring 23 rotates at a certain angle.

As shown in FIG. 1 and FIG. 2, in the quick tripping device of this embodiment, the first transmission structure 15 and the contact spring 23 are preferably disposed coaxially and rotate synchronously. It should be pointed out that the first transmission structure 15 and a rotating shaft of the contact spring 23 may also be arranged in parallel without coinciding; and the first transmission structure 15 and the contact spring 23 may also rotate synchronously, but a driving gap is provided between the first transmission structure 15 and the contact spring 23. That is, when a short-circuiting current flows through the contact system, the moving contact 90 is repelled by an electric repulsion force between the moving contact 90 and the static contact 18. The moving contact 90 drives the contact spring 23 to rotate at a certain angle, and then drives the first transmission structure 15 to rotate, such that the action of triggering the quick tripping device by the bounce of the moving contact 90 is avoided when the moving contact 90 and the static contact 18 are normally closed or disconnected, thereby improving the reliability of the quick tripping device.

As shown in FIGS. 1 to 2, and 4 to 5, the first transmission structure 15 includes a transmission structure mounting portion 15-0 and a transmission structure driven portion 15-2. The contact spring 23 includes a contact spring body 23-0, as well as a first spring end 23-1 and a second spring end 23-2 respectively connected with two ends of the contact spring body 23-0. The first spring end 23-1 includes a first end hanging portion and a first end connecting portion, and two ends of the first end connecting portion are respectively connected with the first end hanging portion and the contact spring body 23-0. The transmission structure mounting portion 15-0 and the first end hanging portion are both rotatably disposed on a first mounting shaft 201, such that the first transmission structure 15 and the contact spring 23 rotate coaxially, which is also conductive to simplifying the structure of the moving contact mechanism. The transmission structure driven portion 15-2 is mounted on the first end connecting portion, such that the first transmission structure 15 rotates along with the contact spring 23. The second spring end 23-2 is connected with the moving contact 90 through a second mounting shaft 202. Further, the first transmission structure 15 further includes a transmission structure connecting hole 15-4 formed in the transmission structure driven portion 15-2, and the transmission structure driven portion 15-2 is disposed to sleeve the first end connecting portion through the transmission structure connecting hole 15-4. As shown in FIG. 1 and FIG. 2, the moving contact 90 includes a moving contact arm 90-0 and a moving contact point 90-1. One end of the moving contact arm 90-0 is disposed on the contact support 110, the moving contact point 90-1 is disposed on the other end of the moving contact arm 90-0, and a moving contact connecting groove or hole matched with the second mounting shaft 202 is formed in the middle of the moving contact arm 90-0. The static contact 18 includes a static contact arm 18 and a static contact point 18-1. The static contact arm 18 includes a first portion and a second portion which are connected in a bending manner and are of a U-shaped structure as a whole. The static contact point 18-1 is disposed on a free end of the first portion. When a current flows through the contact system, the moving contact arm 90-0 and the first portion are disposed oppositely to each other and have opposite current directions inside.

Figure 4:
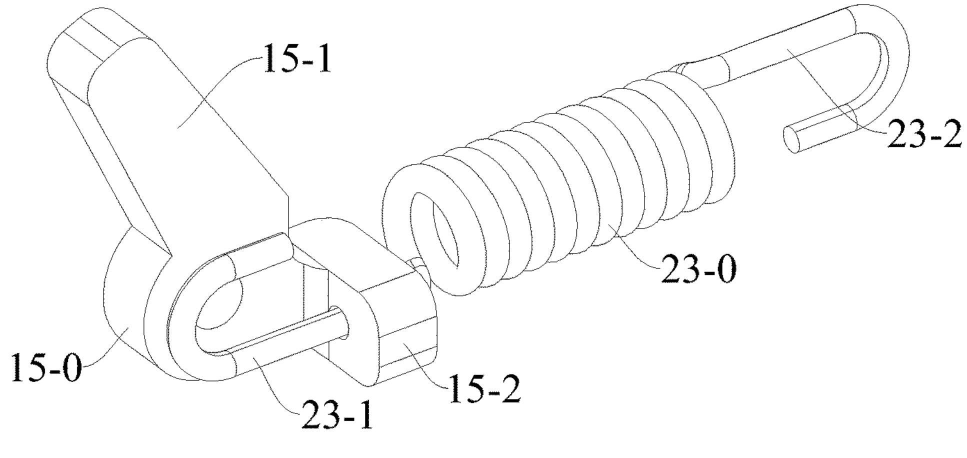
FIG. 4 is a schematic diagram of an assembled structure of the first transmission structure and a contact spring of the present invention.
Figure 5:
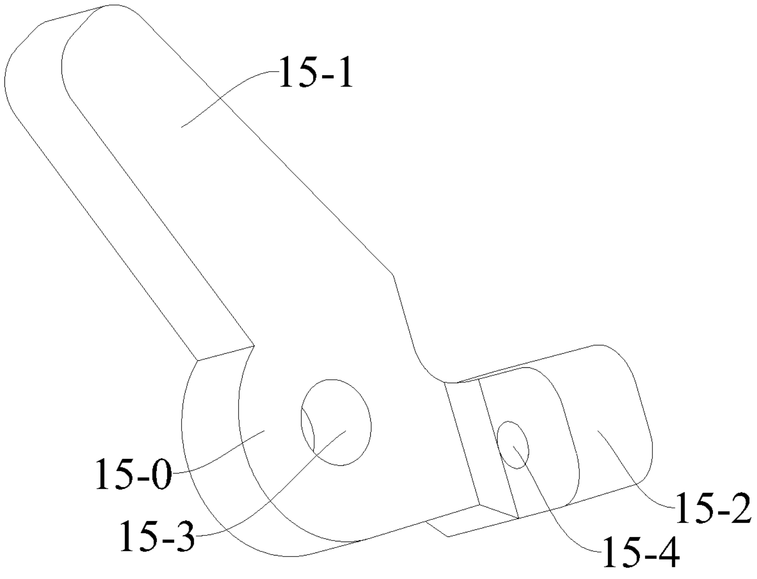
FIG. 5 is a schematic structural diagram of the first transmission structure of the present invention.

As shown in FIGS. 4 to 5, as an embodiment of the first transmission structure 15; the first transmission structure 15 includes a transmission structure mounting portion 15-0, a transmission structure driving portion 15-1 and a transmission structure driven portion 15-2, wherein the transmission structure mounting portion 15-0 and the transmission structure driving portion 15-1 are disposed coplanarly, the transmission structure driven portion 15-2 is disposed perpendicularly to the transmission structure mounting portion 15-0, and the transmission structure mounting portion 15-0 is provided with a transmission structure shaft hole 15-3 matched with the first mounting shaft 201.

As another embodiment, the first transmission structure 15 may also not be provided with a transmission structure driven portion 15-2, or the transmission structure driven portion 15-2 and the transmission structure mounting portion 15-0 are combined into a whole. A limiting groove matched with the first spring end 23-1 is formed in the transmission structure mounting portion 15-0, and the first spring end 23-1 is placed in this limiting groove, which can also realize the synchronous rotation of the first transmission structure 15 and the contact spring 23.

Figure 3:
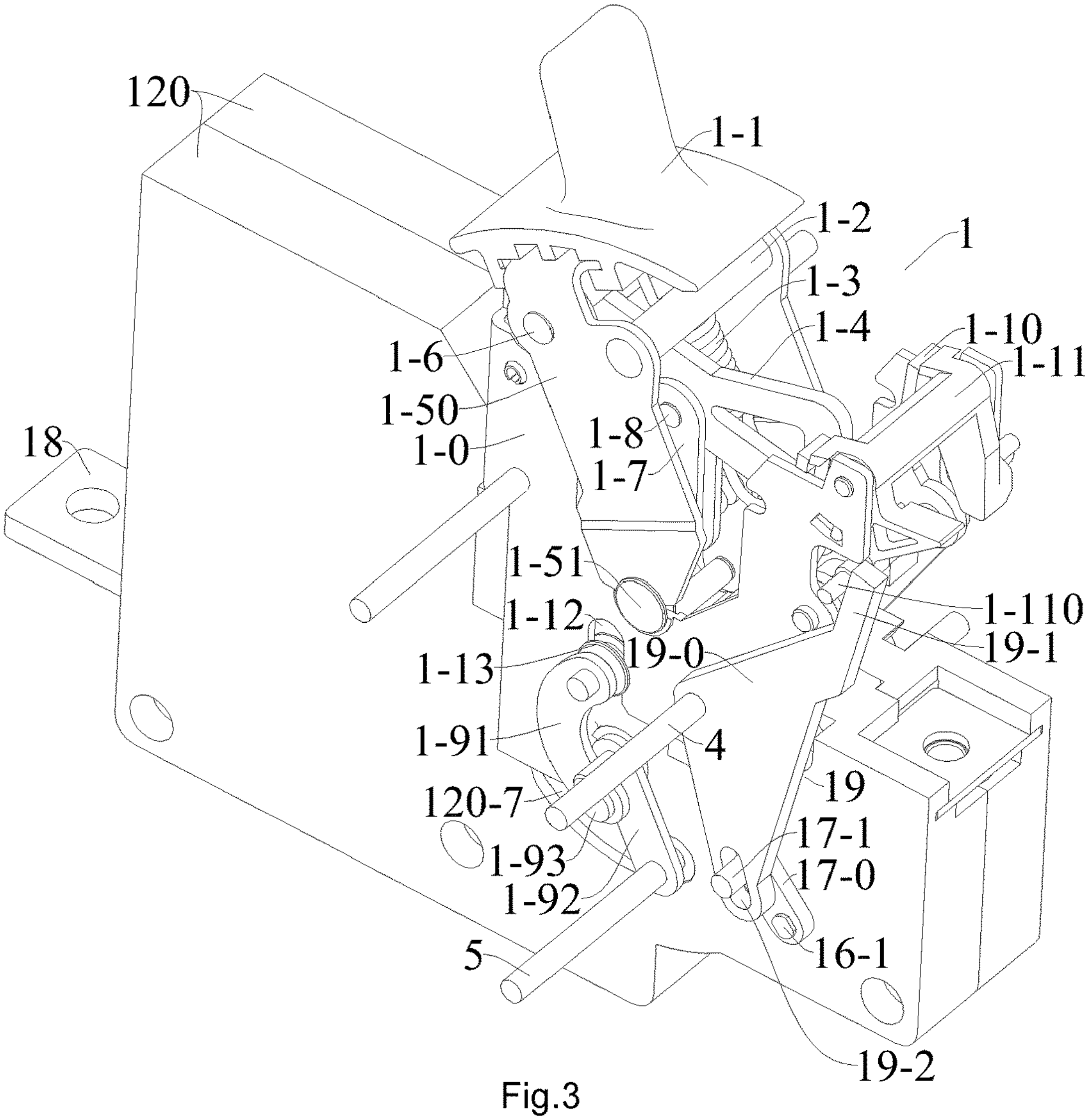
FIG. 3 is a schematic diagram of a three-dimensional structure of the quick tripping device of the present invention, in which a mating relationship of the first intermediate shaft, a second intermediate push rod, a second intermediate shaft, a second push rod and an operating mechanism is shown.
Figure 9:
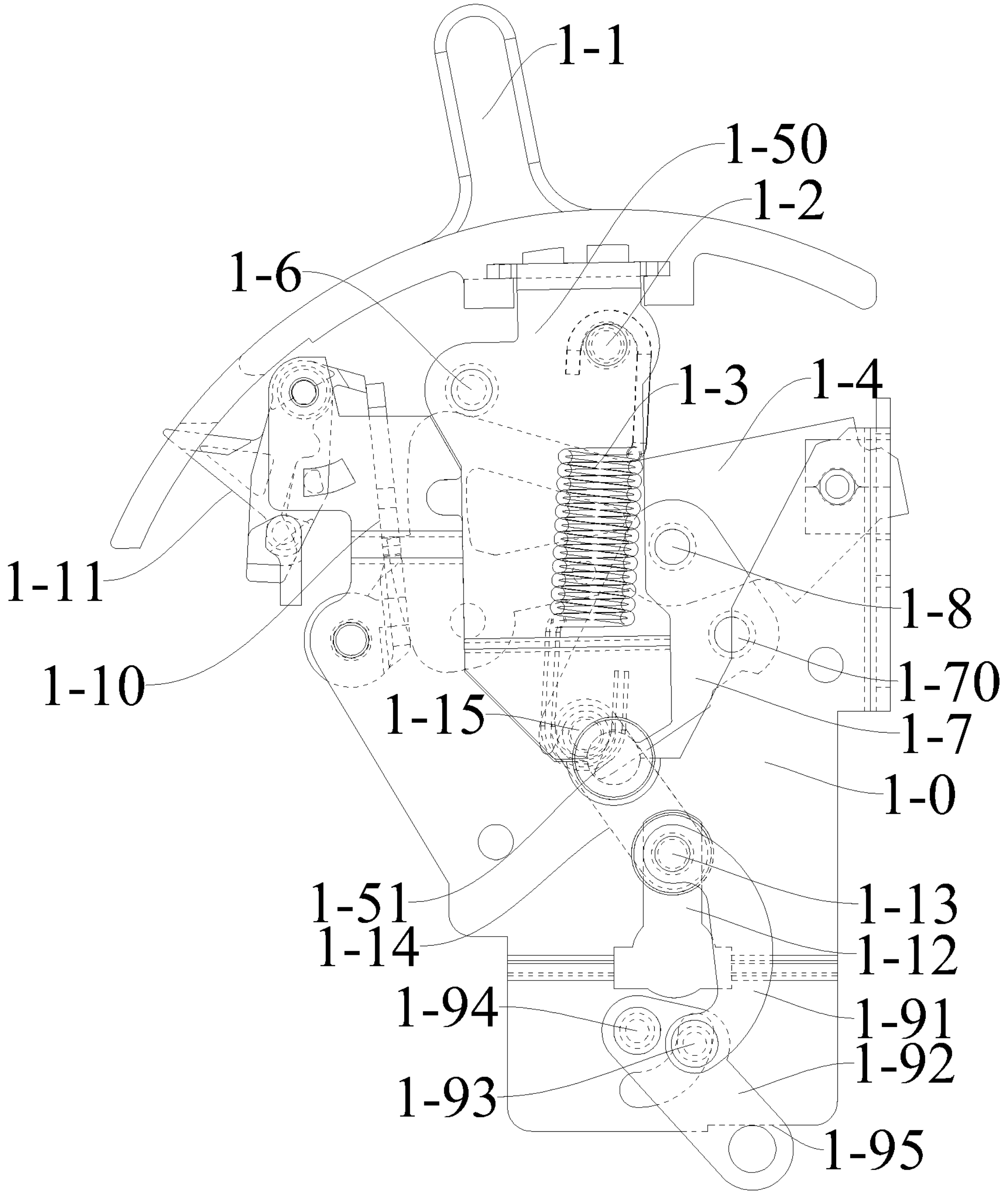
FIG. 9 is a schematic structural diagram of the operating mechanism of the present invention, in which the operating mechanism is in a disconnected state.

The first transmission structure 15 may drive the operating mechanism directly or indirectly to trip. As shown in FIGS. 1 to 3, in an embodiment in which the first transmission structure 15 drives the operating mechanism indirectly to trip, the quick tripping device in this embodiment further includes an intermediate transmission structure and a second transmission structure 19, wherein the first transmission structure 15 is in driving fit with the second transmission structure 19 through the intermediate transmission structure, and the second transmission structure 19 is in driving fit with the operating mechanism 1. Further, as shown in FIG. 3 and FIG. 9, the operating mechanism 1 includes a jump buckle 1-4, a lock buckle 1-10 and the re-buckle 1-11; the jump buckle 1-4 is in locking fit with the lock buckle 1-10; the lock buckle 1-10 is in limiting fit with the re-buckle 1-11; and the second transmission structure 19 is in driving fit with the re-buckle 1-11. When a short-circuiting current flows through the contact system, the second transmission structure 19 drives the re-buckle 1-11 to release the limiting fit with the lock buckle 1-10, so that the lock buckle 1-10 to release the locking fit with the jump buckle 1-4, and the operating mechanism 1 trips. As another embodiment, the first transmission structure 15 may obviously drive the operating mechanism indirectly through other transmission structure to trip.

Preferably, as shown in FIGS. 1 to 3, the intermediate transmission structure includes a first intermediate push rod 16-0, a first intermediate shaft 16-1, a second intermediate push rod 17-0 and a second intermediate shaft 17-1, wherein the first intermediate push rod 16-0 is in driving fit with the first transmission structure 15; the first intermediate push rod 16-0 and the second intermediate push rod 17-0 are fixedly connected to the first intermediate shaft 16-1 respectively; the first intermediate push rod 16-0, the second intermediate push rod 17-0 and the first intermediate shaft 16-1 are disposed to rotate synchronously around an axis of the first intermediate shaft 16-1; and the second intermediate shaft 17-1 is connected with the second intermediate push rod 17-0 and is in driving fit with the second transmission structure 19.

Preferably, as shown in FIGS. 1 to 2, the first intermediate push rod 16-0 includes a first intermediate push rod driven portion 16-01 and a first intermediate push rod limiting portion 16-02, the first intermediate push rod driven portion 16-01 is in driving fit with the first transmission structure 15. The quick tripping device further includes an intermediate push rod limiting protrusion 120-9 which is in limiting fit with the first intermediate push rod limiting portion 16-02. Specifically, as shown in FIGS. 1 to 2, the middle of the first intermediate push rod 16-0 is fixedly connected to the first intermediate shaft 16-1, and the first intermediate push rod driven portion 16-01 and the first intermediate push rod limiting portion 16-02 are disposed at two ends of the first intermediate push rod 16-0 respectively. The first intermediate push rod driven portion 16-01 is in driving fit with the transmission structure driving portion 15-1 of the first transmission structure 15. The first intermediate push rod limiting portion 16-02 is in limiting fit with the intermediate push rod limiting protrusion 120-9 to limit a reset position of the first intermediate push rod 16-0, that is, to limit the relative position between the first intermediate push rod driven portion 16-01 and the transmission structure driving portion 15-1. The intermediate push rod limiting protrusion 120-9 serves as a part of a circuit breaker housing or a structure separately disposed and fixed on the circuit breaker housing.

Figure 6:
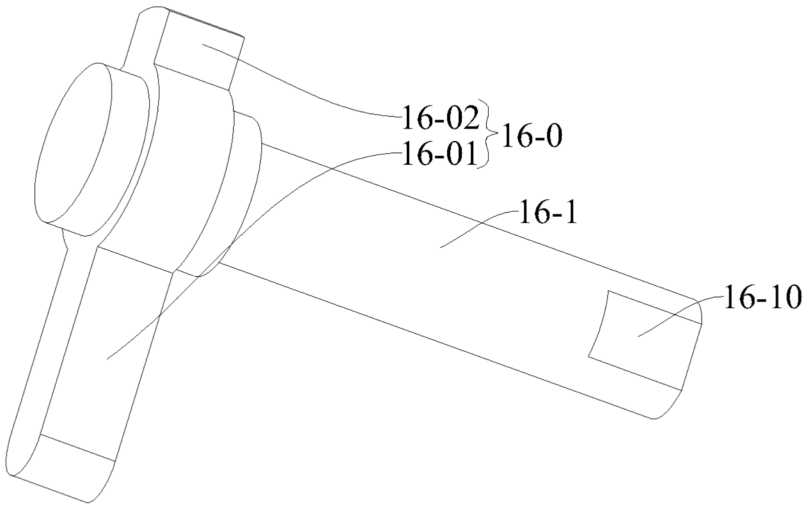
FIG. 6 is a schematic diagram of an assembled structure of the first intermediate pushing rod and the first intermediate shaft of the present invention.

Preferably, as shown in FIG. 3 and FIG. 6, one end of the second intermediate push rod 17-0 is detachably connected to the first intermediate shaft 16-1. An intermediate shaft limiting plane 16-10 is disposed at one end of the first intermediate shaft 16-1. A second intermediate push rod connecting hole is formed in one end of the second intermediate push rod 17-0. The sidewall of the second intermediate push rod connecting hole is provided with a connecting hole which is in limiting fit with the intermediate shaft limiting plane 16-10. such that the second intermediate push rod 17-0 and the first intermediate shaft 16-1 rotate synchronously. The second intermediate shaft 17-1 is disposed on the other end of the second intermediate push rod 17-0.

Preferably, as shown in FIG. 3, the second transmission structure 19 is a second push rod; and the second push rod is rotatably mounted on a second push rod shaft 4, and is provided with a push rod driven hole 19-2 that is in driving fit with the second intermediate shaft 17-1, and a push rod driving part 19-1 that is in driving fit with the re-buckle 1-11 of the operating mechanism 1. The second push rod in this embodiment is of a triangular plate-like structure, at one vertex angle of which a push rod driven hole 19-2 is formed to be in driving fit with the second intermediate shaft 17-1, at a second vertex angle of which a second push rod shaft 4 is disposed rotatably, and at a third vertex angle of which the push rod driving part 19-1 that is in driving fit with the re-buckle 1-11 of the operating mechanism 1 is disposed. Further, as shown in FIG. 3, the push rod driven hole 19-2 is a kidney-shaped hole.

Preferably, as shown in FIG. 3, the re-buckle 1-11 includes a re-buckle driven column 1-110 that is in driving fit with the push rod driving part 19-1.

As shown in FIG. 1 and FIG. 3, a transmission path from the contact spring 23 to the operating mechanism 1 is provided with a driving gap, and the driving gap makes the contact spring 23 turn around a set angle and then drives the operating mechanism 1 to trip. The malfunction of the quick tripping device due to the bounce of the moving contact 90 is avoided when the moving contact 90 and the static contact 18 are closed normally. Further, the magnitude of the set angle is related to the size of the driving gap.

As shown in FIG. 1, in the quick tripping device of the circuit breaker of the present invention, the driving gap is preferably formed between the first transmission structure 15 and the first intermediate push rod 16-0. When the moving contact 90 is repelled by the electric repulsion force between the moving contact 90 and the static contact 18 as the short-circuiting current flows through the contact system, the moving contact 90 drives the first transmission structure 15 through the contact spring 23 to turn around the driving gap, then makes contact with the first intermediate push rod 16-0 and drives the first intermediate push rod 16-0 to rotate. Specifically, in a direction shown in FIG. 1, when the moving contact 90 is repelled by the electric repulsion force between the moving contact 90 and the static contact 18, the moving contact 90 drives the first transmission structure 15 through the contact spring 23 to turn around the driving gap, and is in driving fit with the first intermediate push rod driven portion 16-01 of the first intermediate push rod 16-0. The advantage of providing the driving gap between the first transmission structure 15 and the first intermediate push rod 16-0 lies in that: the re-buckle 1-11 of the operating mechanism 1 can drive the second transmission structure 19, the second intermediate shaft 17-1, the second intermediate push rod 17-0, the first intermediate shaft 16-1 and the first intermediate push rod 16-0 to reset, and the first transmission structure 15 is driven by the contact spring 23 to reset, so there is no need to provide additional resetting members.

As another embodiment, as shown in FIG. 1 and FIG. 3, the driving gap may also be provided between the contact spring 23 and the first transmission structure 15, or between the second transmission structure 19 and the re-buckle 1-11 of the operating mechanism 1. Further, as shown in FIG. 1 and FIG. 3, the quick tripping device further needs to be provided with a resetting member to reset components inside the first transmission structure 15 and/or the second transmission structure 19 and/or the intermediate transmission structure.

As another embodiment, as shown in FIG. 1 and FIG. 3, the driving gap may theoretically also be provided between the second intermediate shaft 17-1 and the second transmission structure 19, or between the second intermediate shaft 17-1 and the second intermediate push rod 17-0, or between the second intermediate push rod 17-0 and the first intermediate shaft 16-1, or between the first intermediate shaft 16-1 and the first intermediate shaft 16-0.

The "driving gap" is actually an empty stroke at one end of the transmission path from the contact spring 23 to the operating mechanism 1.

As shown in FIG. 1 and FIG. 2, the contact spring 23 remains on one side of a first center 79 when the moving contact 90 and the static contact 18 are normally closed or disconnected. When the moving contact 90 is repelled by the electric repulsion force between the moving contact 90 and the static contact 18, the moving contact 90 drives the contact spring 23 to rotate, so that an axis of the contact spring 23 swings to the other side of the first center 79. The contact spring 23 applies a breaking force to the moving contact 90 to remain the moving contact 90 in a temporary breaking position so as to avoid secondary closing of the moving contact 90 and the static contact 18, thereby improving the breaking performance of the circuit breaker. Specifically, when the moving contact 90 is repelled by the static contact 18, the moving contact 90 rotates relative to the contact support 110. The moving contact 90 drives the second spring end 23-2 of the contact spring 23 to rotate around the first spring end 23-1, and the second spring end 23-2 moves along with the moving contact 90, so that the axis of the contact spring 23 swings to the other side of the first center 79. The contact spring 23 applies a breaking force to the moving contact 90, so that the moving contact 90 remains in the temporary breaking position. Further, as shown in FIG. 1, when the moving contact 90 and the static contact 18 are closed normally, the contact spring 23 applies a closing force to the moving contact 90, so that the moving contact 90 remains in the closed position and remains closed with the static contact 18.

Specifically, as shown in FIG. 1 and FIG. 2, when the moving contact 90 rotates from its closed position with the static contact 18 to the temporary breaking position, the axis of the contact spring 23 is driven to rotate at an angle $\alpha$, and the first center 79 is located on the angular bisector of the angle $\alpha$.

As shown in FIG. 1 and FIG. 2, when the contact spring 23 swings from one side of the first center 79 to the other side of the first center and when the contact spring 23 is located in a dead point position, the first center 79 is located on the axis of the contact spring 23. Further, as shown in FIG. 1 and FIG. 2, the axis of the contact spring 23 coincides with the geometric axis of the contact spring 23.

It should be noted that a case where the moving contact 90 and the static contact 18 are normally closed or disconnected refers that: a user or operator drives the moving contact 90 and the static contact 18 through the operating mechanism 1 to be closed or disconnected, and the operating mechanism 1 trips, except a case where the operating mechanism trips when the moving contact 90 is repelled by the static contact 18, resulting in the disconnection of the moving contact 90 from the static contact 18.

As shown in FIG. 1 and FIG. 2, the following is the action process of the quick tripping device of the present invention:

as shown in FIG. 1, in the quick tripping device of the present invention, when the moving contact 90 and the static contact 18 are normally closed or disconnected, the moving contact mechanism and the first transmission structure 15 rotate as a whole, and the contact support 110 and the moving contact 90 do not rotate oppositely to each other, but the moving contact 90 has a certain bounce when closed; and during the rotation process, the transmission structure driving portion 15-1 of the first transmission structure 15 does not drive the first intermediate push rod 16-0 to rotate. As shown in FIG. 2, the moving contact 90 is repelled by the electric repulsion force between the moving contact 90 and the static contact 18 as the short-circuiting current flows through the contact system. Since the operating mechanism has not tripped, the moving contact 90 rotates relative to the contact support 110 and rotates to the temporary breaking position, and then the moving contact 90 drives the first transmission structure 15 to rotate through the contact spring 23 at the same time, so that the transmission structure driving portion 15-1 of the transmission structure 15 turns around the driving gap, and then makes contact with the first intermediate push rod driven portion 16-01 of the first intermediate push rod 16-0 to drive the first intermediate push rod 16-0 to rotate. The first intermediate push rod 16-0 drives the re-buckle 1-11 of the operating mechanism 1 to rotate successively through the first intermediate shaft 16-1, the second intermediate push rod 17-0, the second intermediate shaft 17-1 and the second transmission structure 19, so that the re-buckle 1-11 to release the limiting fit with the lock buckle 1-10; and the lock buckle 1-10 rotates and to release the locking fit with the jump buckle 1-4, such that the operating mechanism 1 trips, and the operating mechanism 1 drives the entire moving contact mechanism to the breaking position.

As shown in FIG. 3 and FIG. 9, as an embodiment of the operating mechanism 1, the operating mechanism 1 further includes a bracket 1-0, a rocker arm assembly rotatably disposed on the bracket 1-0, a first crank 1-7 rotatably disposed on the jump buckle 1-4 around a second center 1-8, an energy storage spring 1-3, sliding rails 1-12, a slide block 1-13, and a first connecting rod 1-14. The jump buckle 1-4, the lock buckle 1-10 and the re-buckle 1-11 are rotatably disposed on the bracket 1-0, respectively. The rocker arm assembly includes a synchronously actuated handle 1-1, a rocker arm 1-50, and a reset structure 1-6 for driving the jump buckle 1-4 and the lock buckle 1-10 to rebuckle. The rocker arm 1-50 is rotatably disposed on the bracket 1-0. The first crank 1-7 includes a crank limiting portion 1-70, which is in limiting fit with the jump buckle 1-4 when the operating mechanism 1 is in a closed state or tripped state. The slide block 1-13 is disposed on the sliding rails 1-12 and slides reciprocally in its extension direction. One end of the first connecting rod 1-14 and one end of the energy storage spring 1-3 are rotatably connected to the first crank 1-7 around a third center 1-15, the other end of the first connecting rod 1-14 is rotatably connected to the slide block 1-13, and the other end of the energy storage spring 1-3 is rotatably connected to the rocker arm assembly. The sliding rails 1-12 are in limiting fit with the slide block 1-13 to prevent the slide block 1-13 from slipping when the operating mechanism 1 is in a disconnected state or tripped state. Further, as shown in FIGS. 9 to 11, the energy storage spring 1-3 is rotatably disposed on the rocker arm 1-50 around a fourth center 1-2, the third center 1-15 and the fourth center 1-2 are located on both sides of the jump buckle 1-4, respectively, and the rocker arm 1-50 is rotatably disposed on the bracket 1-0 around a sixth center 1-51.

Figure 10:
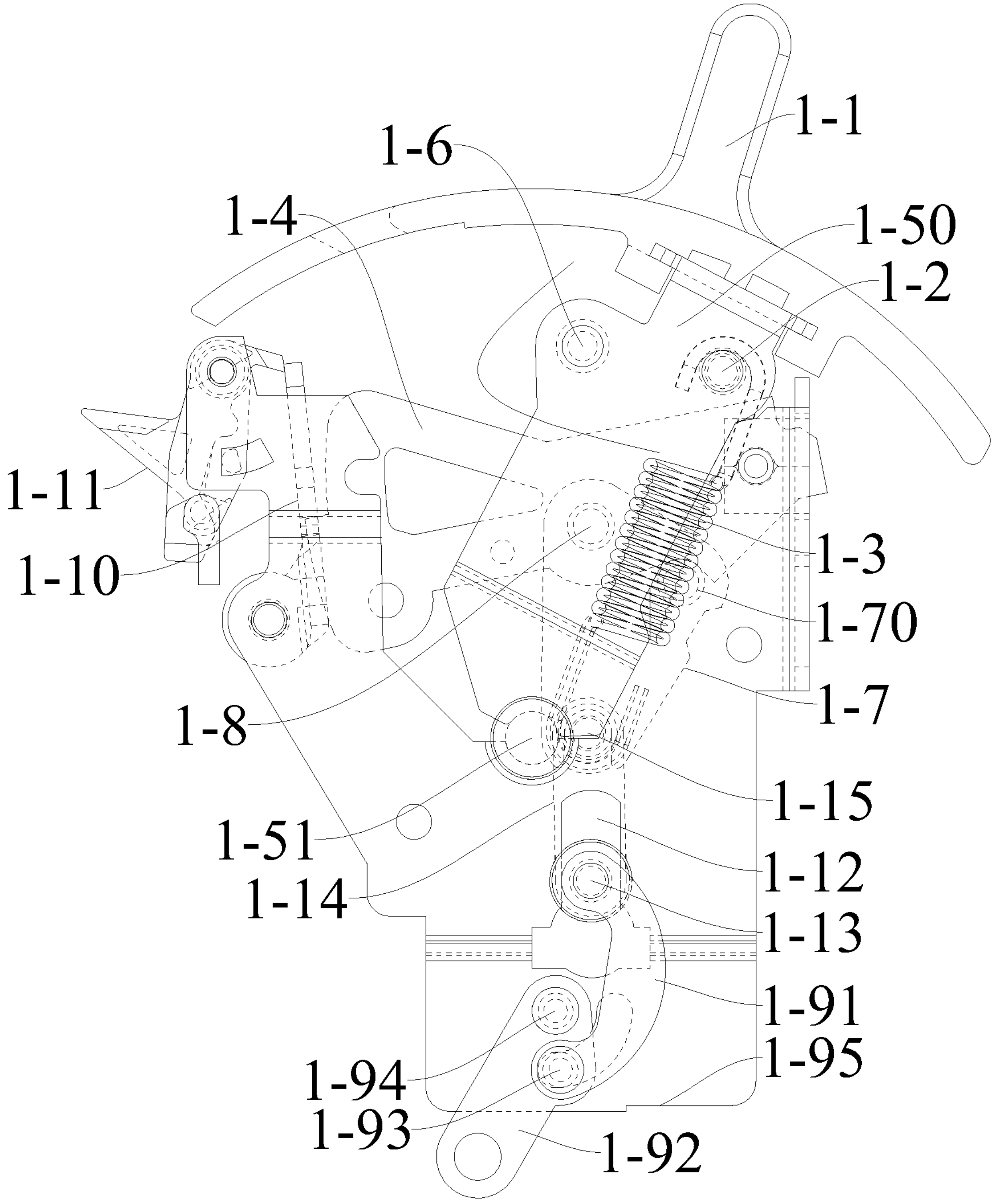
FIG. 10 is a schematic structural diagram of the operating mechanism of the present invention, in which the operating mechanism is in a closed state.
Figure 11:
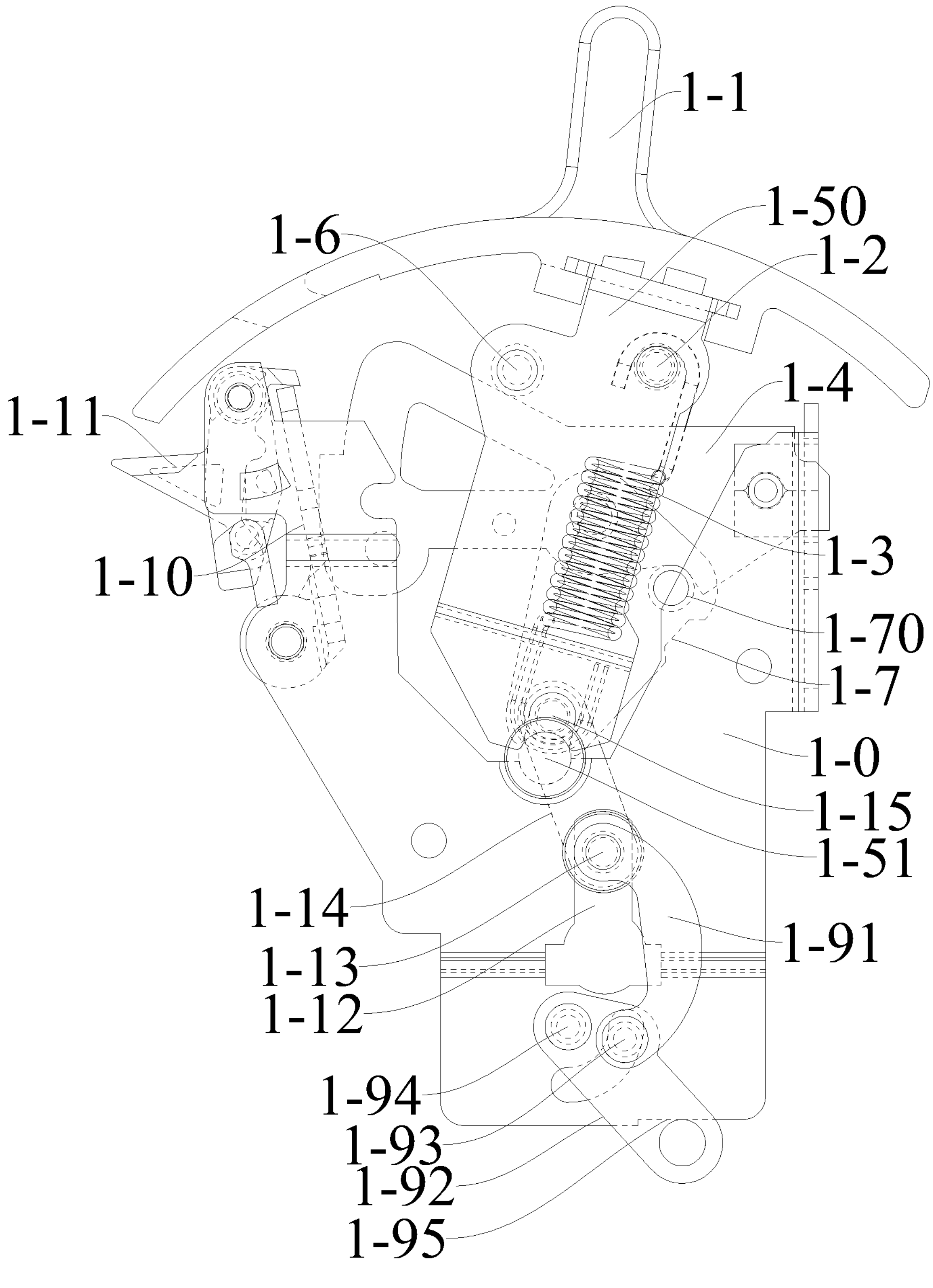
FIG. 11 is a schematic structural diagram of the operating mechanism of the present invention, in which the operating mechanism is in a tripped state.

Preferably, as shown in FIG. 3 and FIGS. 9 to 11, the operating mechanism 1 further includes a second connecting rod 1-91, wherein one end of the second connecting rod 1-91 is rotatably connected to the slide block 1-13, and the other end of the second connecting rod 1-91 is rotatably connected to a second crank 1-92. One end of the second crank 1-92 is rotatably disposed around the fifth center 1-94, and the other end of the second crank 1-92 is connected to the contact support 110 (as shown in FIG. 3, the second crank 1-92 is preferably connected to the contact support 110 via a linkage shaft 5). One end of the second connecting rod 1-91 is rotatably connected to the slide block 1-13, and the other end of the second connecting rod 1-91 is rotatably connected to the middle of the second crank 1-92 around the sixth center 1-93. Further, as shown in FIGS. 9 to 11, one end of the second crank 1-92 is rotatably disposed on the bracket 1-0 around the fifth center 1-94, the second connecting rod 1-91 is rotatably connected to the second crank 1-92 through a sixth connecting shaft, and the bracket 1-0 is provided with an arc-shaped hole which is used for avoiding the sixth connecting shaft and matches its movement trajectory.

As another embodiment, the operating mechanism 1 is not provided with the second crank 1-92, while one end of the second connecting rod 1-91 is rotatably connected to the slide block 1-13, and the other end of the second connecting rod 1-91 is directly connected to the contact support 110.

Preferably, the sliding rails 1-12 may be in a straight shape, an arc shape, a triangular shape, or a combination of the straight shape and the arc shape. The specific shape of the sliding rails 1-12 may also be adaptively adjusted according to a current level of the circuit breaker, a design space, control requirements, and the like. Specifically, the sliding rails 1-12 may be set in a straight shape, an arc shape, or a combination of the straight shape and the arc shape. When the circuit breaker is disconnected or tripped, the slide block 1-13 moves upward along the sliding rails 1-12. When the circuit breaker is closed, the slide block 1-13 moves downward along the sliding rails 1-12, and the trajectory of upward movement coincides with the trajectory of downward movement. In the case that the sliding rails 1-2 are set in the triangular shape and the circuit breaker is disconnected or tripped, the movement trajectory of the slide block 1-13 along the sliding rails 1-12 is upward along one side of the triangle; and when the circuit breaker is closed, the movement trajectory of the slide block 1-13 along the sliding rails 1-12 is downward along the other side of the triangle, but the trajectory of downward movement does not coincide with the trajectory of upward movement (not shown). The slide block 1-13 forms a closed-shaped movement trajectory along the sliding rails 1-12.

Preferably, the sliding rails 1-12 may be disposed on the bracket 1-0 or the circuit breaker housing. As shown in FIG. 9, in the present invention, the sliding rails 1-12 are preferably straight grooves formed in a pair of opposite sidewalls of the bracket 1-0. Two ends of the slide block 1-13 are respectively disposed on the two sliding rails 1-12.

The following is a process of switching the operating mechanism 1 among a disconnected state, a closed state and a tripped state, and the details are as follows:

as shown in FIGS. 9 to 11, two ends of the swing stroke of the rocker arm 1-50 are a first stroke end and a second stroke end, respectively; and two ends of the energy storage spring 1-3 are a first energy storage spring end and a second energy storage spring end, respectively, which are connected to the rocker arm assembly and the first crank 1-7 respectively. Specifically, as shown in FIGS. 9 to 11, the first stroke end and the second stroke end of the rocker arm 1-50 are a right end and a left end of the swing stroke of the rocker arm 1-50 respectively, the upper end of the energy storage spring 1-3 is the first energy storage spring end, and the lower end of the energy storage spring 1-3 is the second energy storage spring end.

An action process of the operating mechanism 1 being switched from the closed state to the disconnected state will be described below in conjunction with FIGS. 9 to 10: as shown in FIG. 10, in the case that the operating mechanism 1 is in the closed state, the rocker arm 1-50 swings toward the second stroke end and drives the first storage energy spring end to rotate around the second energy storage spring end, until the energy storage spring 1-3 turns around the first dead center position; the energy storage spring 1-3 drives the first crank 1-7 to rotate in a second direction and drives the rocker arm 1-50 to swing to the second stroke end; the first crank 1-7 drives the slide block 1-13 through the first connecting rod 1-14 to slide along the sliding rails 1-12; and the slide block 1-13 drives the contact support 110 to rotate in the first direction to a breaking position through the second connecting rod 1-91 and the second crank 1-92, so that the operating mechanism is switched to a disconnected state shown in FIG. 9. Specifically, as shown in FIGS. 9 to 10, in the case that the operating mechanism 1 is switched from the closed position to the disconnected position, the slide block 1-13 moves upward along the sliding rails 1-12, the first direction is counterclockwise, and the second direction is clockwise. When the energy storage spring 1-3 is located at the first dead point position, the energy storage of the energy storage spring 1-3 reaches a maximum value, the second center 1-8 is located on a first axis, the energy storage spring 1-3 turns around the first dead point position around the second energy storage spring end, and the axis of the energy storage spring turns around the second center 1-8. Therefore, the second center 1-8 may also be regarded as the first dead center position, that is to say, the axis of the energy storage spring turns around the second center 1-8, i.e., the energy storage spring 1-3 turns around the first dead point position. It needs to be pointed out that, as shown in FIG. 9, when the operating mechanism 1 is in the disconnected state, the linkage shaft 5 for connecting the contact support 110 and the second crank 1-92 is limited by a limiting plane 1-95 of the bracket 1-0 (as shown in FIGS. 9 to 11, the limiting plane 1-95 is preferably a lower edge of the sidewall of the bracket 1), so that the contact support 110 can no longer continue to rotate in the first direction. The contact support 110 limits the slide block 1-13 through the second connecting rod 1-91 at the same time to prevent the slide block 1-13 from sliding upward along the sliding rails 1-12. Therefore, the slide block 1-13 is prevented from continuing to slide upward along the sliding rails 1-12 depending on the limiting of the upper ends of the slide wails 1-12 to the slide block 1-13, which is conducive to reducing the impact damage between the slide block 1-13 and the sliding rails 1-12, and also prolonging the service life of operating mechanism 1.

An action process of the operating mechanism 1 being switched from the disconnected state to the closed state will be described below in conjunction with FIGS. 9 to 10: as shown in FIG. 9, in the case that the operating mechanism 1 is in the disconnected state, the rocker arm 1-50 swings toward the first stroke end and drives the first energy storage spring end to rotate around the second energy storage spring end, until the energy storage spring 1-3 turns around the first dead center position; the energy storage spring 1-3 drives the first crank 1-7 to rotate in the first direction, such that the crank limiting portion 1-70 is in limiting fit with the jump buckle 1-4, thereby preventing the first crank 1-7 from rotating in the first direction; meanwhile, the energy storage spring 1-3 drives the rocker arm 1-50 to swing to the first stroke end, and the first crank 1-7 drives the slide block 1-13 through the first connecting rod 1-14 to slide along the sliding rails 1-12; the sliding rails 1-13 drive the contact support 110 to rotate in the second direction to a closed position through the second connecting rod 1-91 and the second crank 1-92, so that the operating mechanism is switched to the closed state shown in FIG. 10; and the first direction and the second direction are opposite to each other. Specifically, as shown in FIGS. 9 to 10, the slide block 1-13 moves downward along the sliding rails 1-12 while the operating mechanism 1 is switched from the disconnected state to the closed state. It should be pointed out that, as shown in FIG. 10, the moving contact 90 and the static contact 18 are closed while the operating mechanism 1 is in the closed state, so that the contact support 110 continues to rotate in the second direction, and the contact support 110 forms limiting for the slide block 1-13 through the second connecting rod 1-91 at the same time, thereby preventing the slide block 1-13 from sliding downward along the sliding rails 1-12.

An action process of the operating mechanism 1 being switched from the closed state to the tripped state will be described below in conjunction with FIGS. 10 to 11: as shown in FIG. 10, in the case that the operating mechanism 1 is in the closed state, the re-buckle 15 rotates to release the limiting fit with the lock buckle 1-10, and the lock buckle 1-10 rotates to release the locking fit with the jump buckle 1-4; the jump buckle 1-4 rotates and drives the first crank 1-7 to rotate synchronously, the first crank 1-7 drives the slide block 1-13 through the first connecting rod 1-14 to slide along the sliding rails 1-12, and meanwhile, the slide block 1-13 drives the contact support 110 through the second connecting rod 1-91 to rotate in the second direction to a breaking position; and the energy storage spring 1-3 drives the rocker arm 1-50 to swing toward the second stroke end to the reset structure 1-6 and to be in limiting fit with the jump buckle 1-4, and the operating mechanism is switched to a tripped state shown in FIG. 11. Specifically, as shown in FIGS. 10 to 11, the slide block 1-13 moves upward along the sliding rails 1-12 while the operating mechanism 1 is switched from the closed state to the tripped state. It should be pointed out that, as shown in FIG. 11, the linkage shaft 5 for connecting the contact support 110 and the second crank 1-92 is limited by the limiting plane 1-95 of the bracket 1-0 while the operating mechanism 1 is in the tripped state, so that the contact support 110 cannot continue to rotate in the first direction, and the contact support 110 forms limiting for the slide block 1-13 through the second connecting rod 1-91 at the same time, thereby preventing the slide block 1-13 from sliding upward along the sliding rails 1-12.

An action process of the operating mechanism 1 being switched from the tripped state to the disconnected state will be described below in conjunction with FIGS. 9 and 11: as shown in FIG. 11, in the case that the operating mechanism 1 is in the tripped state, the rocker arm 1-50 swings to the second stroke end, and the rocker arm 1-50 drives the jump buckle 1-4 through the reset structure 1-6 to rotate to be in locking fit with the lock buckle 1-10; and meanwhile, the lock buckle 1-10 rotates to be in limiting fit with the re-buckle 15, and the operating mechanism is switched to the disconnected state shown in FIG. 9.

Figure 7:
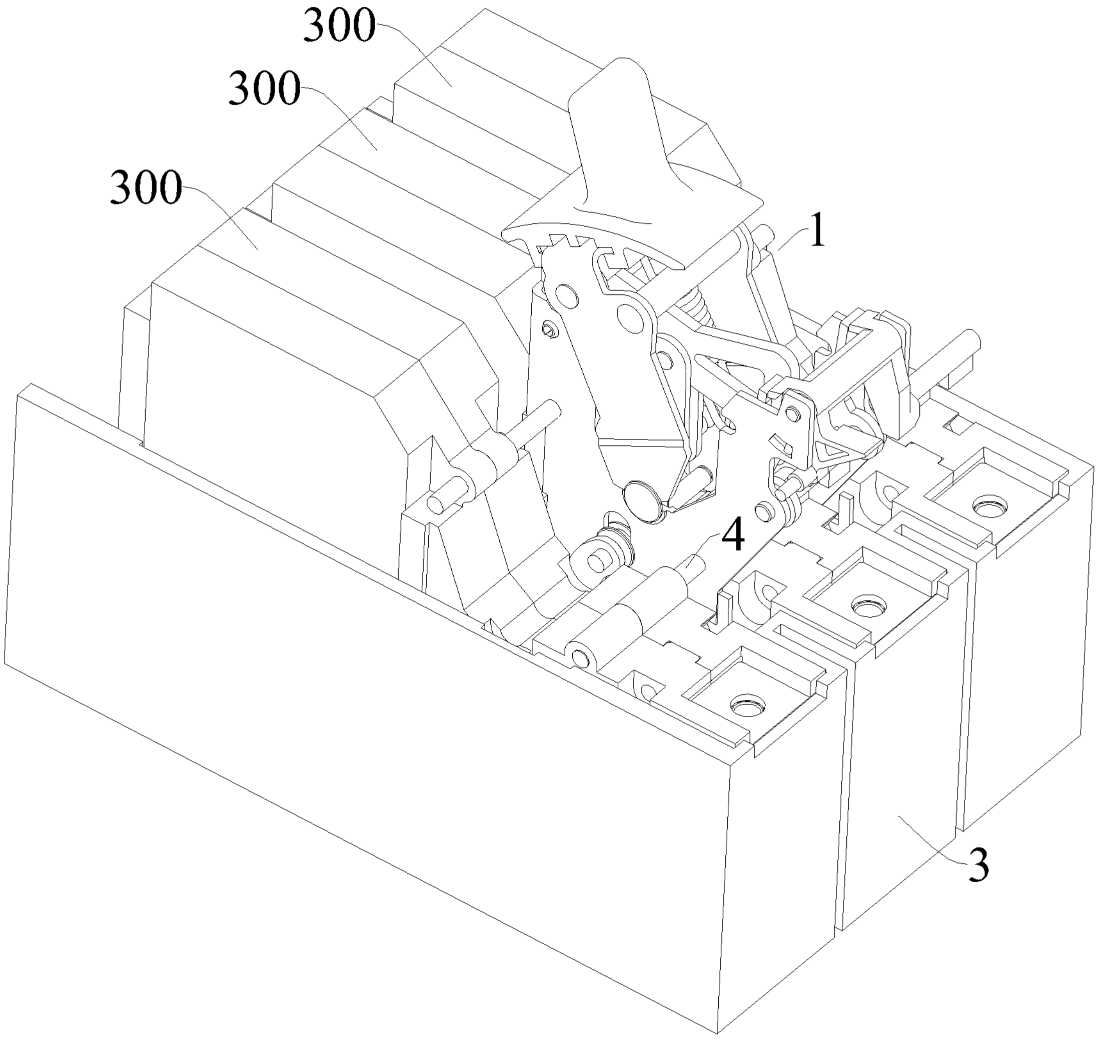
FIG. 7 is a schematic diagram of a three-dimensional structure of a circuit breaker of the present invention.
Figure 8:
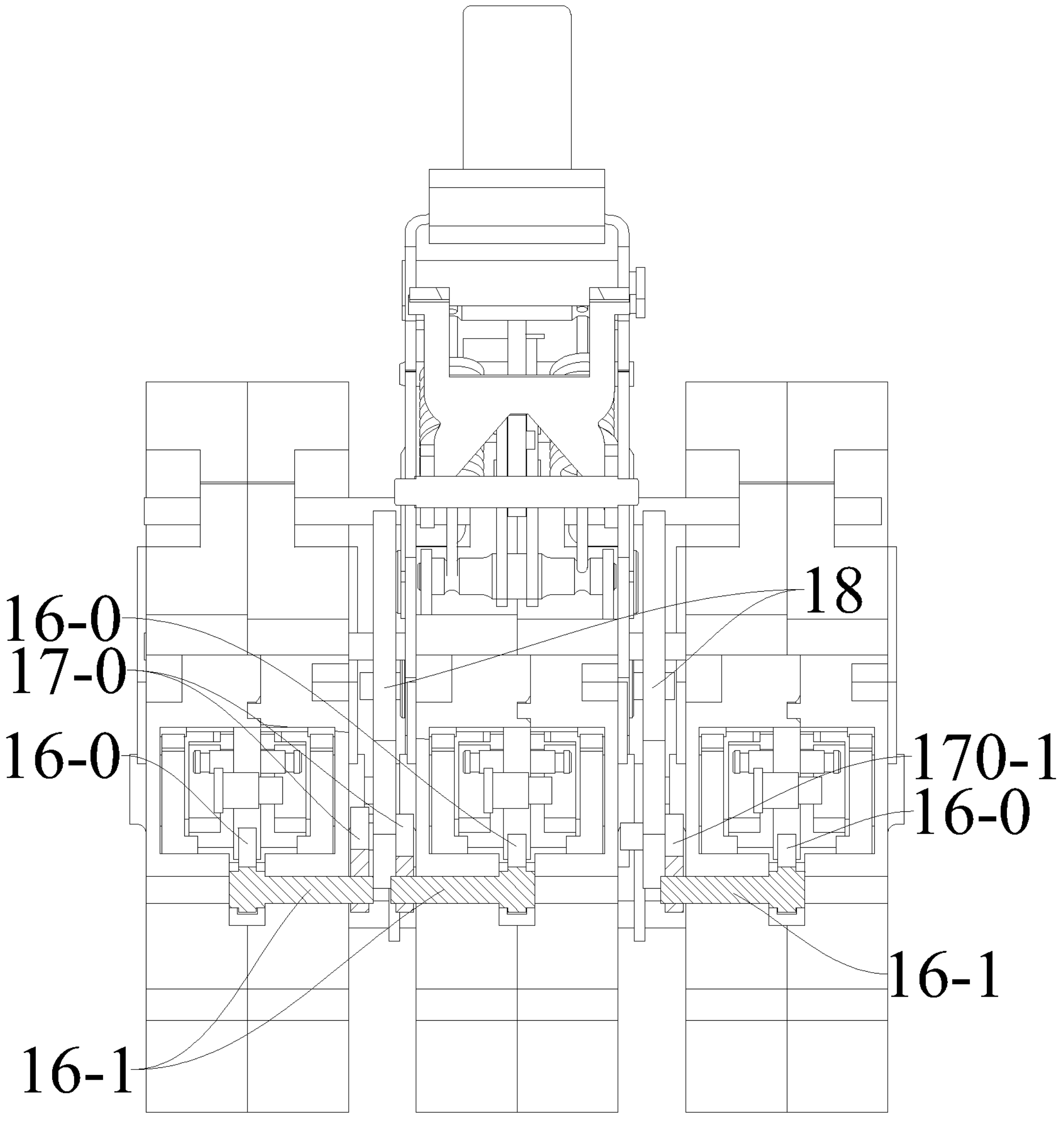
FIG. 8 is a schematic diagram of a projection structure of the circuit breaker of the present invention.

As shown in FIG. 7 and FIG. 8, the present invention further discloses a circuit breaker. The circuit breaker further includes the quick tripping device. The circuit breaker further includes at least one circuit breaker pole 300, each circuit breaker pole 300 including a unit housing 120 and a contact system disposed within the unit housing 120. The first intermediate shaft 16-1 of the quick tripping device is inserted in the unit housing 120, and an inner end and an outer end of the first intermediate shaft 16-1 are in driving connection to the first intermediate push rod 16-0 and the second intermediate push rod 17-0, respectively; and the second transmission structure 19 of the quick tripping device is rotatably disposed outside the unit housing 120.

Preferably, as shown in FIG. 7 and FIG. 8, the circuit breaker is a multi-pole circuit breaker, wherein a plurality of circuit breaker poles 300 is disposed side by side, and moving contact mechanisms of the respective circuit breaker poles 300 are connected by the linkage shaft 5 and rotate synchronously. The operating mechanism 1 is disposed to span above one circuit breaker pole 300 and is in driving connection to the linkage shaft 5, and the adjacent circuit breaker poles 300 may share one second transmission structure 19.

Preferably, as shown in FIG. 1 and FIG. 2, an intermediate push rod limiting protrusion 120-9 is disposed in the unit housing 120 and is in limiting fit with the first intermediate push rod limiting portion 16-02 of the first intermediate push rod 16-0.

Specifically, as shown in FIG. 7 and FIG. 8, the circuit breaker of the present invention is a three-phase circuit breaker, wherein two adjacent circuit breaker poles 300 share one second transmission structure 19, and the third circuit breaker pole 300 independently uses one second transmission structure 19. The operating mechanism 1 is disposed to span above the intermediate circuit breaker pole 300, and one end of the second crank 1-92 of the operating mechanism 1 is connected to the linkage shaft 5.

The above content is a further detailed description of the present invention in conjunction with specific preferred embodiments, but it cannot be regarded that the specific embodiments of the present invention are limited to these descriptions. For a person of ordinary skill in the art to which the present invention belongs, without departing from the idea of the present invention, a number of simple deductions or replacements may be made, which should be regarded as falling within the protection scope of the present invention.

The invention claimed is:

1. A tripping device of a circuit breaker, comprising an operating mechanism and a contact system, wherein the contact system comprises a moving contact mechanism and a static contact which are used cooperatively; the moving contact mechanism comprises a contact support rotatably disposed around a first center, and a moving contact disposed on the contact support and capable of rotating relative to the contact support; the moving contact mechanism further comprises a contact spring, and two ends of the contact spring are connected with the moving contact and the contact support respectively; the tripping device further comprises a first transmission structure rotatably disposed on the contact support and being in driving fit with the operating mechanism; the first transmission structure is in driving fit with the contact spring and rotates along with the contact spring; when a short-circuiting current flows through the contact system, the moving contact is repelled by an electric repulsion force between the moving contact and the static contact, so that the moving contact rotates relative to the contact support; the moving contact drives the first transmission structure to rotate through the contact spring; and the first transmission structure drives the operating mechanism to trip.

2. The tripping device of the circuit breaker according to claim 1, wherein the first transmission structure drives the operating mechanism directly or indirectly to trip.

3. The tripping device of the circuit breaker according to claim 1, wherein the operating mechanism comprises a jump buckle, a lock buckle and a re-buckle; the jump buckle is in locking fit with the lock buckle; the lock buckle is in limiting fit with the re-buckle; and the first transmission structure is in driving fit with the re-buckle directly or indirectly, such that the operating mechanism trips.

4. The tripping device of the circuit breaker according to claim 1, wherein a transmission path from the contact spring to the operating mechanism is provided with a driving gap, and the driving gap makes the contact spring rotate to a set angle and then drives the operating mechanism to trip.

5. The tripping device of the circuit breaker according to claim 1, wherein the contact spring remains on one side of the first center when the moving contact and the static contact are normally closed or disconnected; when the moving contact is repelled by said electric repulsion force between the moving contact and the static contact, the moving contact drives the contact spring to rotate, so that an axis of the contact spring swings to an other side of the first center; the contact spring applies a breaking force to the moving contact to remain the moving contact in a breaking position; and when the contact spring swings from said one side of the first center to the other side of the first center and when the contact spring is located in a dead point position, the first center is located on the axis of the contact spring.

6. The tripping device of the circuit breaker according to claim 1, wherein the first transmission structure and the contact spring are disposed coaxially and rotate synchronously.

7. The tripping device of the circuit breaker according to claim 6, wherein the first transmission structure comprises a transmission structure mounting portion and a transmission structure driven portion; the contact spring comprises a contact spring body, as well as a first spring end and a second spring end respectively connected with two ends of the contact spring body; the first spring end comprises a first end hanging portion and a first end connecting portion, and two ends of the first end connecting portion are respectively connected with the first end hanging portion and the contact spring body; the transmission structure mounting portion and the first end hanging portion are both rotatably arranged on a first mounting shaft; the transmission structure driven portion is mounted on the first end connecting portion; and the second spring end is connected with the moving contact through a second mounting shaft.

8. The tripping device of the circuit breaker according to claim 7, wherein the first transmission structure further comprises a transmission structure connecting hole formed in the transmission structure driven portion, and the transmission structure driven portion is disposed to sleeve the first end connecting portion through the transmission structure connecting hole.

9. The tripping device of the circuit breaker according to claim 1, wherein the tripping device further comprising an intermediate transmission structure and a second transmission structure, wherein the first transmission structure is in driving fit with the second transmission structure through the intermediate transmission structure, and the second transmission structure is in driving fit with the operating mechanism.

10. The tripping device of the circuit breaker according to claim 9, wherein the intermediate transmission structure comprises a first intermediate push rod, a first intermediate shaft, a second intermediate push rod and a second intermediate shaft, wherein the first intermediate push rod is in driving fit with the first transmission structure; the first intermediate push rod and the second intermediate push rod are fixedly connected to the first intermediate shaft respectively; the first intermediate push rod, the second intermediate push rod and the first intermediate shaft are disposed to rotate synchronously around an axis of the first intermediate shaft; and the second intermediate shaft is connected with the second intermediate push rod and is in driving fit with the second transmission structure.

11. The tripping device of the circuit breaker according to claim 10, wherein the first intermediate push rod comprises a first intermediate push rod driven portion which is in driving fit with the first transmission structure, and a first intermediate push rod limiting portion; and the tripping device further comprises an intermediate push rod limiting protrusion which is in limiting fit with the first intermediate push rod limiting portion.

12. The tripping device of the circuit breaker according to claim 10, wherein the second transmission structure is a second push rod; and the second push rod is rotatably mounted on a second push rod shaft, and is provided with a push rod driven hole that is in driving fit with the second intermediate shaft, and a push rod driving part that is in driving fit with a re-buckle of the operating mechanism.

13. The tripping device of the circuit breaker according to claim 12, wherein the second push rod is of a triangular plate-like structure, at one vertex angle of which the push rod driven hole is formed, at a second vertex angle of which the second push rod shaft is disposed rotatably, and at a third vertex angle of which the push rod driving part is disposed; and the re-buckle comprises a re-buckle driven column which is in driving fit with the push rod driving part.

14. A circuit breaker, wherein the circuit breaker comprises the tripping device according to claim 1.

15. The circuit breaker according to claim 14, wherein the circuit breaker further comprises at least one circuit breaker pole, each circuit breaker pole comprises a unit housing and a contact system disposed within the unit housing; the tripping device further comprising an intermediate transmission structure and a second transmission structure, the first transmission structure is in driving fit with the second transmission structure through the intermediate transmission structure, and the second transmission structure is in driving fit with the operating mechanism; the intermediate transmission structure comprises a first intermediate push rod, a first intermediate shaft, a second intermediate push rod and a second intermediate shaft, wherein the first intermediate push rod is in driving fit with the first transmission structure; the first intermediate push rod and the second intermediate push rod are fixedly connected to the first intermediate shaft respectively; the first intermediate push rod, the second intermediate push rod and the first intermediate shaft are disposed to rotate synchronously around an axis of the first intermediate shaft; and the second intermediate shaft is connected with the second intermediate push rod and is in driving fit with the second transmission structure; the first intermediate shaft of the tripping device is inserted in the unit housing, and an inner end and an outer end of the first intermediate shaft are in driving connection to the first intermediate push rod and the second intermediate push rod, respectively; and the second transmission structure of the tripping device is rotatably disposed outside the unit housing.

* * * * *